(12) United States Patent
Kolakowski (10) Patent No.: US 7,512,749 B2
(45) Date of Patent: Mar. 31, 2009

(54) SAFE SOFTWARE REVISION FOR EMBEDDED SYSTEMS

(75) Inventor: Mikolaj Kolakowski, Reda (PL)

(73) Assignee: Intel Corporation, Santa Clara, CA (US)

( * ) Notice: Subject to any disclaimer, the term of this patent is extended or adjusted under 35 U.S.C. 154(b) by 1487 days.

(21) Appl. No.: 10/609,821

(22) Filed: Jun. 30, 2003

(65) Prior Publication Data

US 2008/0270677 A1  Oct. 30, 2008

(51) Int. Cl.
*G06F 12/06* (2006.01)
*G06F 12/14* (2006.01)

(52) U.S. Cl. .................... 711/154; 711/103
(58) Field of Classification Search .......... None
See application file for complete search history.

(56) References Cited

U.S. PATENT DOCUMENTS 6,266,736 B1 * 7/2001 Atkinson et al. ............ 711/103

* cited by examiner

*Primary Examiner*—Hyung S Sough
*Assistant Examiner*—Duc T Doan
(74) *Attorney, Agent, or Firm*—Blakely, Sokoloff, Taylor & Zafman LLP (57) ABSTRACT

The present invention, in one embodiment includes identifying a first partition of an embedded program memory, reading a description associated with the first partition, identifying a second partition of an embedded program memory, reading a description associated with the second partition, comparing descriptions, selecting an embedded program memory partition using the comparison, and writing program code to the selected program memory partition.

22 Claims, 8 Drawing Sheets

SAFE SOFTWARE REVISION FOR EMBEDDED SYSTEMS

BACKGROUND

1. Field

The present invention pertains to the field of modifications for software in embedded systems and, in particular to upgrading or downgrading software in an embedded system with low risk.

2. Related Art

Software-driven embedded systems can be found in a variety of devices, including peripherals such as printers, projectors and communications ports as well as in household and industrial appliances and high data rate communications networks. An embedded system typically has a processor, some permanent memory containing the software the drives the processor and the device, and some operational memory. During boot up, the processor executes the programs stored in the permanent memory and stores run-time data in the operational memory. From time to time, the programs in the permanent memory may need to be changed by upgrading or by rolling back to a previous version.

The programs stored in the permanent memory usually include a boot PROM, or start up code, kernels, and applications. Each of these elements is typically stored in a separate permanent memory partition. During an upgrade or rollback process, the software in each partition can be accessed independently of the software in other partitions.

Some embedded systems switch into a special service mode for upgrades. In this mode, the old software is removed and new software is stored in its place. During a downgrade process, the same operations are performed as in the upgrade. If the upgrade or downgrade is interrupted or if an error occurs during an upgrade or downgrade process then the device controlled by the embedded system may become unusable. Some devices can be repaired only by physically removing portions of the memory or accessing the memory independent of the rest of the system. This can be costly and time consuming.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1A:
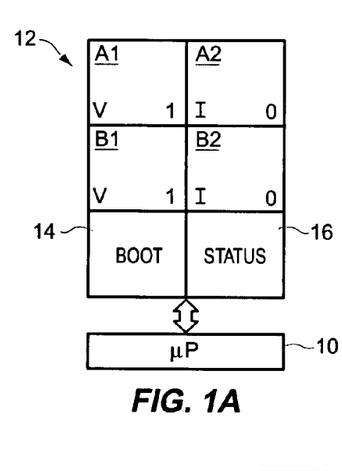
FIGS. 1A through 1E are block diagrams of a processor coupled to a memory according to one embodiment of the invention in which the memory is shown in each of five different states.

FIG. 1A shows an example of a portion of an embedded system suitable for use with some embodiments of the present invention. The embedded system has a microprocessor 10 which accesses a memory 12. The memory 12 shown in FIGS. 1A, 1B, 1C, 1D, and 1E is shown as a partitioned permanent memory, such as flash memory, PROM (Programmable Read Only Memory), NVRAM (Non-Volatile Random Access Memory) or any other type of memory that may be suitable to a particular application. The memory partitioning can be logical, for example, a simple block of memory from address A to B, or it can be physical, such as FLASH.

The partitioning can come from the structure of an embedded application stored in the memory that has several parts. In some embodiments, the parts include kernels, applications, and a bootloader. This kind of memory organization supports storing and running software that consists of more than one part. In some applications, the memory may not be permanent or only semi-permanent. The microprocessor will typically also have access to operational memory (not shown) which may or may not be included in the same chip or chips. The microprocessor can also be coupled to a variety of different input and output ports, coprocessors and engines on one or more busses depending upon the particular application for the embedded system. These elements are not shown in FIGS. 1A through 1E for simplicity.

The memory 12 includes a boot portion 14 containing a boot block or start up code. The boot portion is accessed immediately after the system is switched on. It initializes the system and starts the application software. The memory 12 also contains a separate status portion 16 for configuration parameters and status information. This can include status flags and upgrade counters as discussed below. This status portion is in permanent memory, like the boot portion, so that it is not lost when power is turned off to the system. The permanent memory is also divided, in the example in FIG. 1A, into four additional sections or partitions labeled A1, A2, B1 and B2.

The system software shown in the example of FIG. 1A has upgradeable and non-upgradeable parts. In one embodiment of the invention, one such non-upgradeable part of the software is the start up code 14 which is run right after the processor is put out of a reset or when it is powered on. In some embodiments of the invention, this code cannot be safely upgraded because the software must be stored in a specific memory location. The microprocessor first looks to this memory location when booting up. In an upgrade process, the boot software must remain in this location so that the microprocessor can find it on start up. If, in an upgrade process, the software at this location has changed or moved to another location then the processor may not be able to boot up and the whole system may become unusable. In other embodiments, the startup code can be made upgradeable in a manner similar to that described below with respect of other portions of the permanent memory.

In the example of FIG. 1A, the illustrated upgradeable parts of the software are stored in two versions, each in a separate memory partition. There can be other software parts (not shown) stored in other memory partitions which are not upgradeable in the same way as those shown. FIG. 1A shows an A section with two partitions A1 and A2. The A section of memory can store an A section of code in each of the two partitions A1 and A2 in two different versions, one version for each partition. Similarly a B section of code can be stored in two different versions in the two partitions B1 and B2. The software stored in these partitions may be application software, operating system software or any other software for which an upgrade capability is desired.

In the described embodiment, the partitions each contain a complete copy of the code. For example, the code in partition A1 and partition A2 are each a complete set of code for the A section of the code. At any one time, however, one or the other of the partitions can contain no code, incomplete code, erroneous code, invalid code, or the same code as the other partition. The particular state of the two partitions can vary as described in more detail below.

In addition to the software, each partition can include a partition descriptor. The partition descriptor can have many different types of descriptive information regarding the software code stored in the associated partition. In the example of FIG. 1A, the partition descriptor contains a validity check code and an upgrade counter value. The validity check code can be used for validating the contents of the partition. For example, a cyclic redundancy code (CRC) or any of a variety of other error detection or correction codes can be used to determine whether the code in a partition has any errors. Other possible error detection or correction codes include parity codes, check sum codes, hash functions such as MD5, Hamming codes, and Reed-Solomon codes, among others. A single CRC or other code can be used for an entire partition, or a set of CRC's can be used, each for different portions of a partition. The error determination or determinations can be used to flag the code or sections of codes as valid or invalid. The flags can be used to indicate whether the code is valid or invalid and can form an additional part of a partition descriptor.

The partition descriptor can also include an upgrade counter which indicates the chronology of upgrades between the two partitions. Any of a variety of other codes and description information can be associated with each partition depending on the particular application. This information can be stored in the partition to which it relates, in an associated memory block, or in the status section 16 of the permanent memory 12.

In one embodiment of the invention, while the microprocessor 10 is booting up, the contents of all of the partitions that contain upgradeable software modules can be can't say "must" analyzed. For each module or section of software code to boot up, the microprocessor can access the newest version of the software in each section of permanent memory and apply that as the valid software for start up. The microprocessor can also recheck code validity using the data validation codes and update the validity flags. For error correction codes, it may be able to correct corrupted code sections. This can all be done prior to using the contents of any partition.

Partitions can be designated as destination partitions and source partitions. For an upgrade process, the partition containing the older version of the software becomes the destination partition, i.e. the destination memory for the upgraded software. During an upgrade process, new upgraded software is stored in this destination partition. At the same time an upgrade counter for the destination partition is upgraded to reflect that this is now the newest version of the software.

For a rollback process, the most recent version of the software can be removed so that the older version becomes the newest version. The destination partition is then the one with the newest version of the software. In this case, upgrade counters need not be changed. Instead, the partition with the newer version is marked as invalid. On reboot, after a rollback, the destination partition is the partition that contains valid loadable software. There is no longer any source partition as no further rollbacks can be performed. If multiple rollbacks are desired, this can be accommodated by providing more than two partitions for each section of the software.

As described in more detail below, in one embodiment of the invention, a global "in progress" flag can be used to indicate that either an upgrade or a rollback is in progress. Such a flag can help the system to recover in the event that an upgrade or rollback is unsuccessful. The "in progress" flag marks in permanent memory, such as a status register 16, that an upgrade or rollback operation is in progress. A single flag can be used for both upgrades and rollbacks or two different flags can be used. A different flag can be used for each partition or a single flag can be used for all partitions.

In addition, a global upgrade counter can be stored in a separate permanent memory such as the status registers 16 in FIG. 1A. The global upgrade counter can be used for recovering from an interruption or error in an upgrade or a rollback. The global upgrade counter may be numerical and provide simply a number that is incremented each time an upgrade is performed and decremented each time a rollback is performed. Alternatively, the global upgrade counter can be time based indicating the actual time at which an upgrade or rollback is performed.

When the device reboots, the bootloader will discover that an "in progress" flag is set. This indicates that there may be some inconsistency or error in the contents of a partition. The bootloader can read, for example, the global upgrade counter value which can be set at the same time that the "in progress" flag is set, and search for partitions that have the same value for the upgrade counter. The partitions that have the same upgrade count as the global upgrade counter are the partitions which were being modified when the modification operation was interrupted. They are most likely corrupted and should be invalidated. The validity of these partitions can be checked using a data validation code or simply tagged as invalid.

While, only two sets of memory partitions A and B are shown in FIG. 1A, any number of permanent memory partitions can be created depending upon the flexibility desired. For a development prototype, a large number of memory partitions can allow developers to upgrade many different parts of the operating or applications software separately. For a high volume product, it may be desired to have fewer memory partitions so as to simplify maintenance of the product. The particular number of memory partitions will depend upon the intended application. Furthermore, only two versions of the software can be stored in the two memory partitions A1, A2 of section A shown in FIG. 1A. However, the number of partitions and, as a result the number of possible versions can be increased as desired to suit a particular application. In addition, different sections of the code may have different numbers of partitions.

FIGS. 1A through 1E show various upgrade and rollback processes which can be performed using a partitioned permanent memory as described above. In the example embodiment shown in FIG. 1A, the status of each memory partition A1, A2, B1, and B2 is indicated as either valid (V) or invalid (I). This information is shown as being a part of the memory partition. It can be stored either in each memory partition or in the status registers 16. In addition, an upgrade counter value is shown for each memory partition. In FIG. 1A, the upgrade counter values are 1 and 0. These are shown within each memory partition however, they can alternatively be stored in the status register 16.

The configuration of FIG. 1A is typical for an original product that has just been shipped with no upgrades having been performed. In this initial state, partitions A1 and B1 contain valid software each with an upgrade counter value of 1. The software may be operational or application software, depending on the particular application and configuration of the embedded system. The secondary redundant memory partitions, A2 and B2, have status registers that show invalid software with an upgrade counter value of 0. In one embodiment this partition descriptor (I, 0) indicates the memory partitions are empty. On booting up, the microprocessor 10, after loading the start up code 15, will check the status registers 16 and select the software code which is valid and has the highest upgrade counter values. In the situation of FIG. 1A, this is the software and partitions A1 and B1.

Figure 1B:
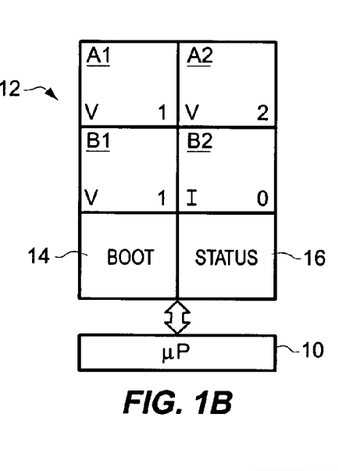

FIG. 1B shows the same microprocessor and permanent memory after a successful upgrade process has been performed. The upgrade has been applied only to the software stored in partition A2 of permanent memory section A. During this process, using the upgrade counters, partition section A1 was identified as a source partition and section A2 as a destination partition. The origin partition software was unaffected by the upgrade process while the new upgraded software was written into the destination partition A2. At the same time, the status register for partition A2 was changed from invalid to valid and the upgrade counter was changed from 0 to 2. In this case, this is the highest value of an upgrade counter for partition A incremented by 1. Accordingly, when the system of FIG. 1B boots up, the microprocessor, after applying the start up code 14, will check the status registers and determine to use the software contained in partitions B1 and A2. As can be seen in FIG. 1B since the software in section B is not upgraded, partition B2 was not affected by the process.

Figure 1C:
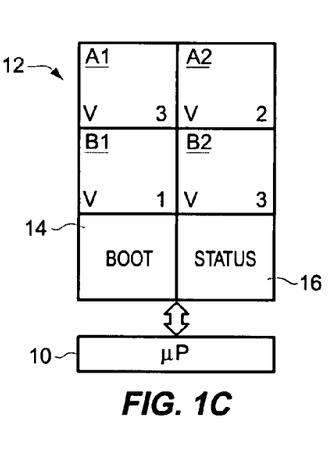

FIG. 1C shows the status of the system after a second upgrade has been performed. In this case, the upgrade has been applied to both sections A and B. For section A, partition A1 is designated as the destination partition because it contains the oldest version of the software. Partition A2 is the source partition and is unaffected by the upgrade. For section B, partition B2 is designated as the destination partition as it contains only invalid software. Partition B1 is unaffected by the upgrade.

Along with the software upgrade, the upgrade counters are incremented. FIG. 1C shows that the upgrade counter for upgraded partition A1 has been incremented to 3 (one more than A2). The upgrade counter for partition B2 has also been incremented to 3. As an alternative, the upgrade counter for partition B2 could be set to 2, the highest upgrade counter value in the B section plus 1.

The embedded system shown in the Figures can include a global upgrade counter as a part of the status registers 16 or in any other part of the system. The global upgrade counter register can be used to store the highest current upgrade counter value. In the prior state, shown in FIG. 1B this value would be 2. For each upgrade, the upgrade counter of all upgraded portions can be set to the highest global upgrade counter value plus 1. Using the example of FIG. 1C, the upgrade counters, after upgrading are set at 3. This is the highest upgrade counter value from FIG. 1B (2) plus 1. A variety of different conventions can be selected for setting values in the upgrade counter. Alternatively, date or time stamps can be used to label upgrades and rollbacks. In the presently described embodiment, there is a global upgrade counter that contains the current highest upgrade counter value. When an upgrade is performed all upgraded partitions are set to the global upgrade counter value incremented by 1.

Figure 1D:
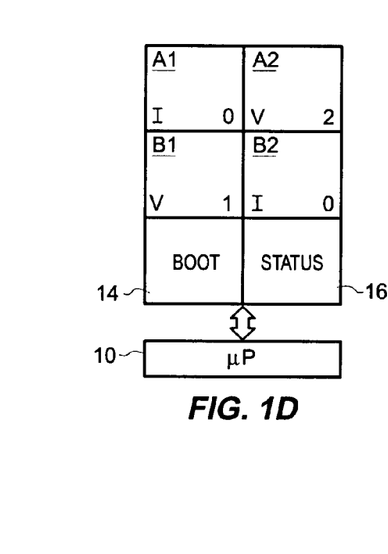

FIG. 1D shows the same system after a rollback occurs. The rollback has been applied to both sections A and B. A rollback can occur because the software in the prior upgrade contained undesired features or contained unpredictable behavior or for any other reason, including developmental testing. To perform the rollback, the status of section A was analyzed to determine that A1 contained the most recent software and A2 the prior version. Each software section (A and B) can be rolled back simply by writing over software memory partition A1 and B2 or by changing the corresponding status flags to invalid. The upgrade counter for partition A1 is reset, e.g. to zero, so that when the system boots up, it will identify partition A2 as the most recent. It will then use the prior version of the software retained in memory partition A2. Similarly, in section B, the upgrade counter for the memory partition B2 is reset or erased. When the system boots up it will boot from the prior version stored in memory partition B1.

Figure 1E:
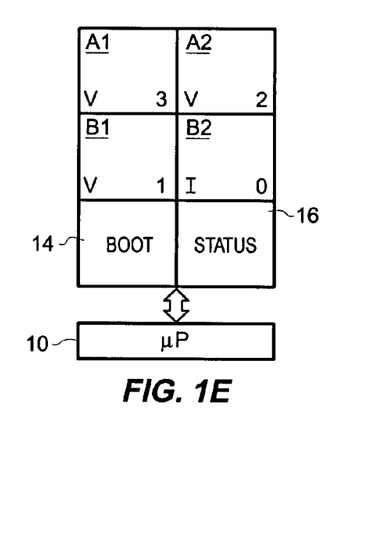

A particular benefit of the system described in FIGS. 1A through 1E is that the entire embedded processor system can recover when errors occur during an upgrade or a rollback. If, for example, upgrades to sections A and B were both attempted from the configuration of FIG. 1D, and the upgrade of section B was interrupted, the system may be in a status as shown, for example, in FIG. 1E. In FIG. 1E, section A has been upgraded and is similar to that of section 1C however, during the upgrade of section B an error or an interruption occurred and this software was not successfully upgraded.

According to one embodiment, while the upgrade or rollback was taking place an "in progress" flag was set and a global upgrade counter was set to 3. During system bootup, the "in progress" flag the global upgrade counter will be checked. The system or bootloader will accordingly start to look for all partitions that have upgrade counters equal to the global upgrade counter value (3). All the partitions with matching upgrade counter values, in this case partition A1, can be identified as corrupted. The bootloader will then rely on A2 instead. The system will use the old set of partitions A2 and B1.

In another embodiment, when the system next boots up, it can check the error status and upgrade status of each memory partition and find that partition B2 has errors. The software in partition B2 can also be checked as part of the upgrade process or at any other time. If upgrade counters are used, it may also find that the upgrade counter of memory partition B2 was not incremented at the end of the rollback or upgrade process. Accordingly, the system will start up using memory partitions A1 and B1. The upgrade can be retried at any later time As can be seen from the description above, any number of memory sections can be upgraded or rolled back safely using the status flags and error checking systems. The status flags and error checks can be used singly or together. In upgrade and rollback processes described above, security can be assured by retaining the prior version of the software even after the operation is performed. These operations are described in greater detail in association with the flow diagrams which follow.

Figure 2:
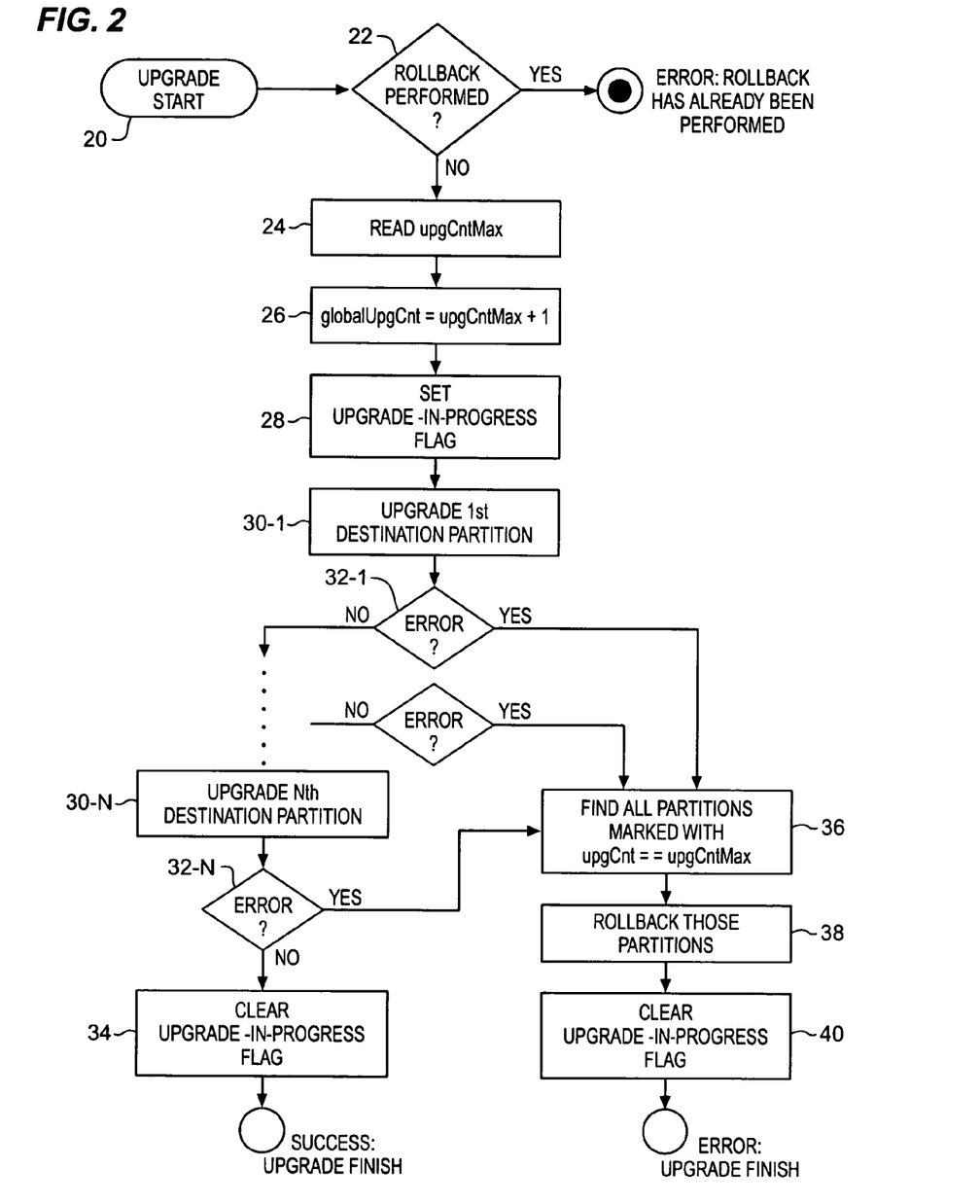
FIG. 2 is a flow chart for upgrading a memory partition according to one embodiment of the invention.

FIG. 2 shows an example of a process for performing an upgrade in any number of destination partitions. The destination partitions are the partitions in which some code will be written over prior invalid or valid code in that partition. In one embodiment, a system upgrade can be described as writing software to the appropriate partitions and mapping all of those partitions with the highest upgrade counter value stored in the global counter upgrade register. The process begins at block 20 and, at block 22, the appropriate partitions are checked to determine whether a rollback has already been performed. If so, then an error is indicated.

An error can be indicated if a rollback has already been performed to prevent the system from attempting the upgrade. After a rollback, the source partitions are corrupted and the destination partitions contain the rollback image. An upgrade would overwrite the rollback image in the destination partition. Before the upgrade can be performed, the source partition and the destination partition must be swapped so that the upgrade overwrites the corrupted source partition. In such an embodiment, upgrade and rollback can be differentiated because upgrade modifies the source partition and rollback modifies the destination partition.

If no error is indicated, then at block 24 the maximum upgrade counter value can be determined for all the source partitions, i.e. the partitions that are to be upgraded. Alternatively, the destination partitions can be identified in any of a variety of other ways. For example, a flag can be set indicating which of the two partitions is the most current and is error free.

At block 26, the global upgrade counter value is incremented by 1 and at block 28 the upgrade-in-progress flag is set. After setting the flag, at block 30 the destination partitions are upgraded. This can be performed for any number of destination partitions. In the example of FIG. 2, N partitions are upgraded so there are blocks 30-1 to 30-N to indicate an upgrade to each of the N destination partitions. Following the upgrade to each destination partition, the upgraded software can be checked using, for example, a CRC at block 32-1. An error or validity check can be performed for each of the N destination partitions at blocks 32-1 to 32-N.

If no errors are detected at blocks 32-1-32-N, then the upgrade-in-progress flag can be cleared. This indicates that the upgrade has finished successfully. If errors do occur, then, at block 36, the partitions for which the upgrade counter has been set to the maximum global upgrade counter value are identified and, at block 38, these partitions are rolled back. After the rollback, the upgrade-in-progress flag is cleared at block 40. The upgrade is then finished with an error.

Figure 3:
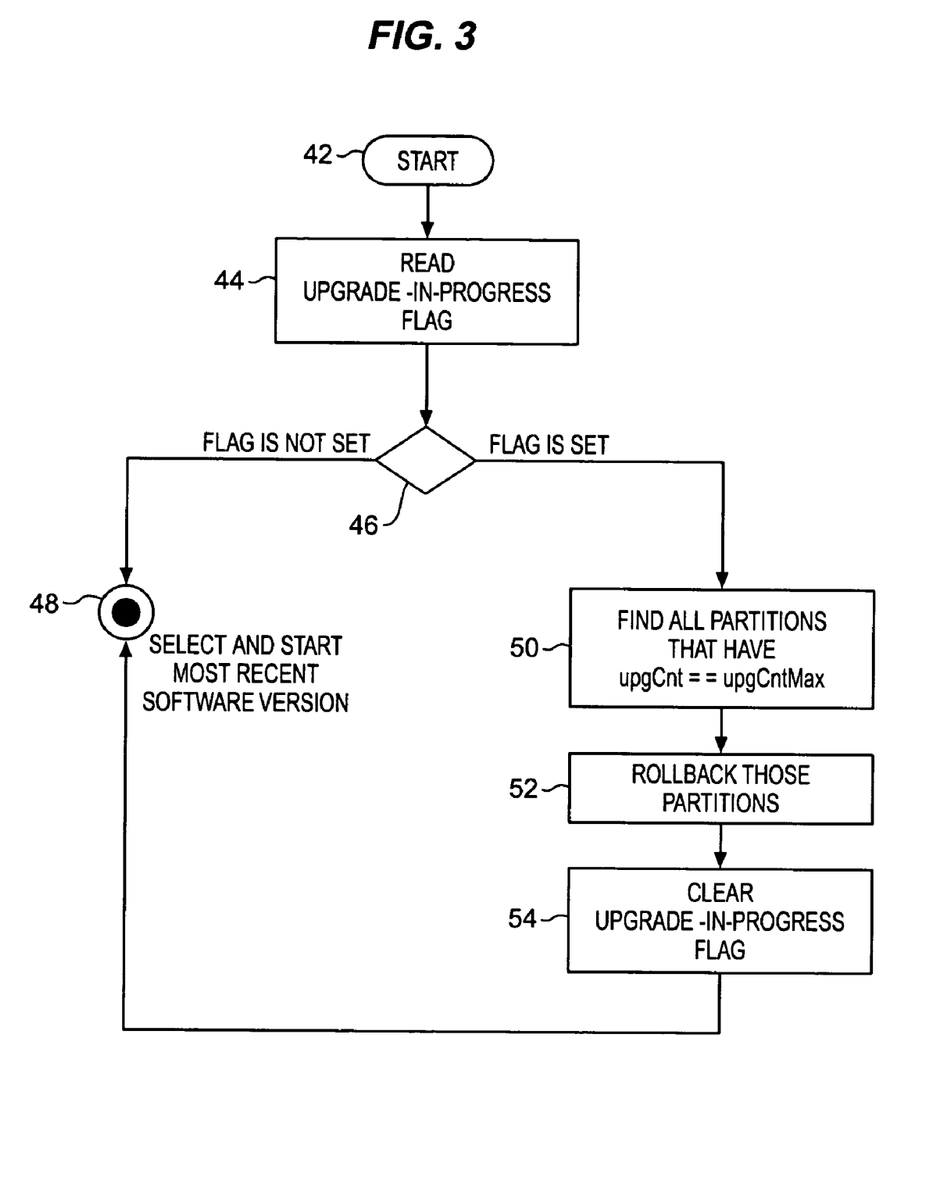
FIG. 3 is a flow chart for booting up software from upgraded memory partitions according to one embodiment of the invention.

As an alternative to rolling back software for unsuccessfully upgraded sections, as shown in FIG. 2, the rollback can occur the next time the system is booted. This also accommodates a situation in which the upgrade was not successful and the upgrade-in-progress flag was not cleared. At block 42, as shown in FIG. 3, this rollback boot up process begins at block 44 and an upgrade-in-progress flag is read. At block 46, if the upgrade-in-progress flag is not set then it can be determined that there are no system errors and at block 46 the most recent software version can be identified and used.

However, if the upgrade-in-progress flag is set on boot up then, at block 50, all of the partitions that have an upgrade counter equal to the maximum upgrade counter value can be identified. These identified partitions can then be rolled back at block 52 to the previous version and the upgrade-in-progress flag is cleared at block 54. At this point, the upgrade counters and status registers are in a condition that allows the system to start up using what is now the most recent software version. This most recent software version excludes all of the unsuccessfully upgraded versions.

Figure 4:
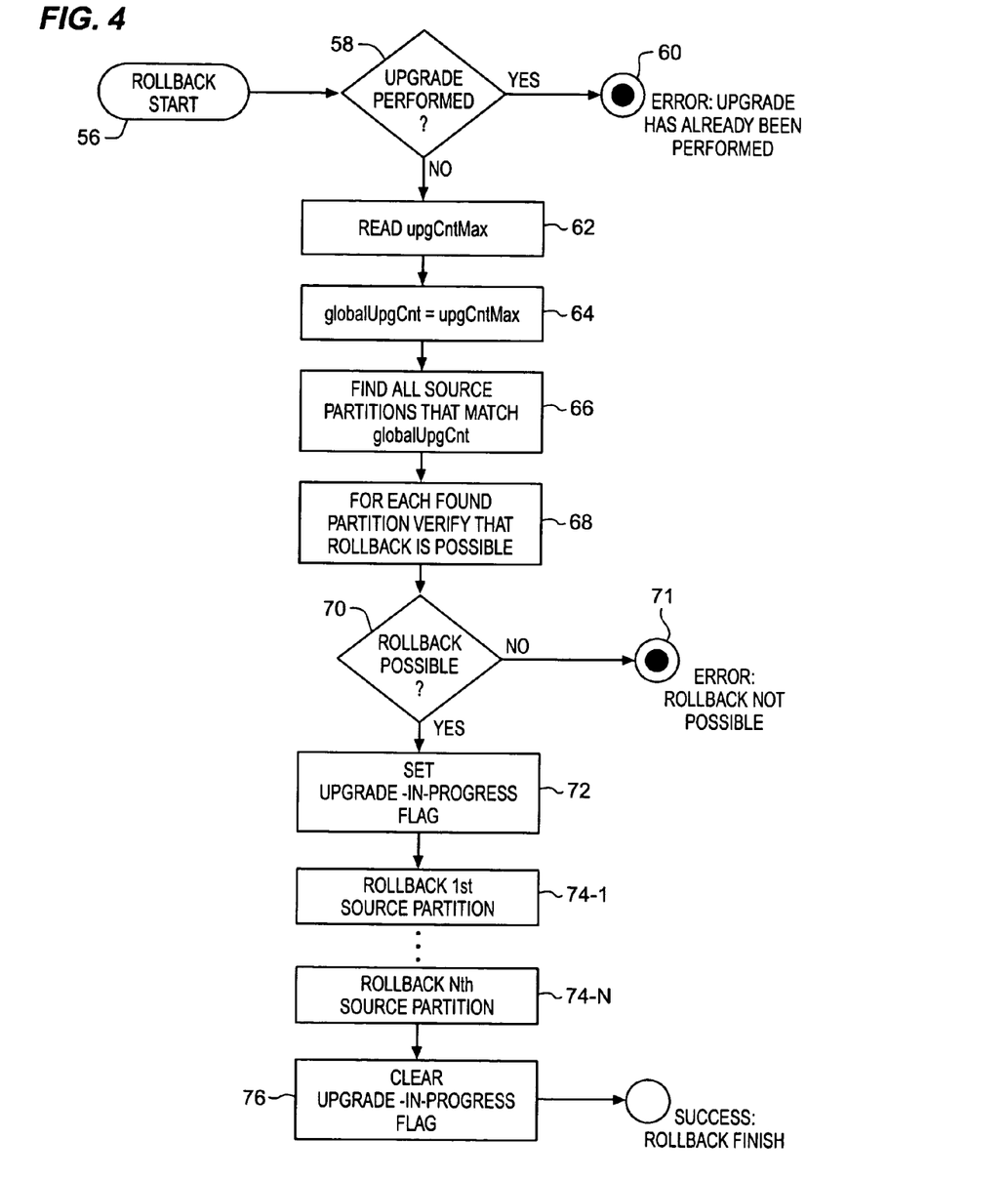
FIG. 4 is a flow chart for rolling back a memory partition according to one embodiment of the invention.

An example of a software rollback is shown in FIG. 4. In the example of FIG. 4, the rollback starts at block 56 by verifying whether rollback is possible. This can be determined in many different ways. In one example, it is determined by checking to see whether an old operational code located in the destination partition is still not removed. If so, then all of the source partitions with the higher upgrade counter can be corrected by marking the corresponding partition descriptors as invalid. As with an upgrade, the rollback operation can be performed with a flag set to indicate that a rollback is in-progress.

Referring to FIG. 4, the rollback starts at block 56. At block 58, it is determined whether an upgrade has been performed. If so, then, at block 60, an error flag is set. As with an upgrade, the maximum value of the upgrade counter for the system is read at block 62 and the global upgrade counter is set to this maximum value at block 64. The particular upgrade counter operations will depend upon how the upgrade counters, if used, are implemented. At block 66 all of the source partitions that match the value of the global upgrade counter are found and at block 68 it is verified for each partition that a rollback is possible. If rollback is possible at block 70, then the rollback can start. Otherwise an error flag can be set at block 71.

Figure 5:
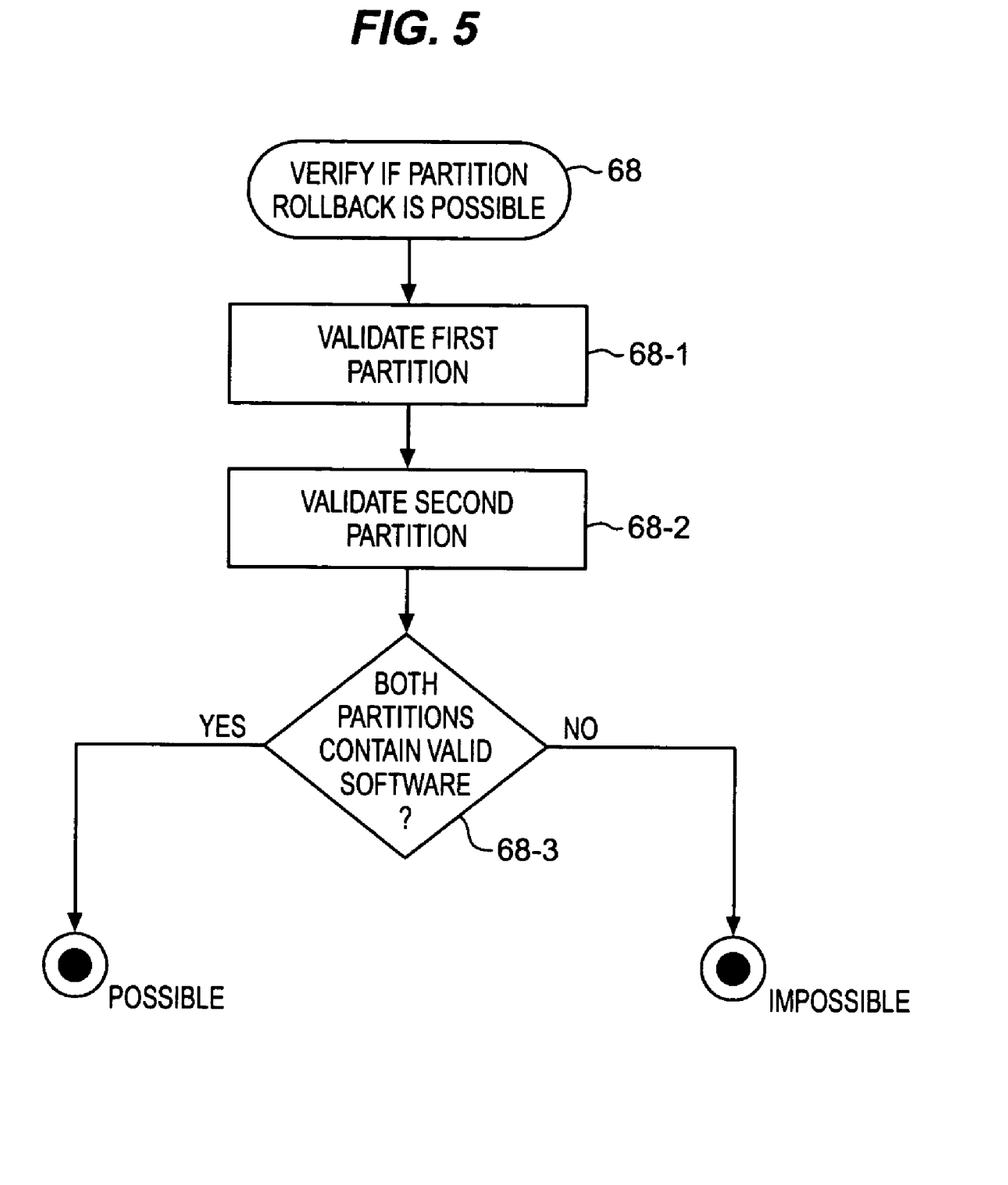
FIG. 5 is a flow chart for identifying memory partitions for a rollback according to one embodiment of the invention.

FIG. 5 shows the process of block 68 of FIG. 4 in more detail. At block 68, to verify if a partition rollback is possible each partition is validated. At block 68-1 the first partition is validated and at block 68-2 a second partition is validated. This continues until all of the identified partitions have been validated. In the examples of FIGS. 1A through 1E, there are two partitions per section, however, any other number of partitions can be used. Validation can occur simply by checking a status register which shows the status as having valid or invalid software. Alternatively, the software can be verified again by checking, for example, a CRC or other error detection or correction code. If a suitable error correction code is available, then it may be possible to correct corrupted code and render invalid software valid. If both partitions for a particular software section have been identified and both contain valid software at block 68-3, a rollback is possible. If either one of the partitions does not contain valid software then a rollback is not possible. If there are more than two partitions, then a rollback can be performed using any two valid partitions.

The decision of whether a rollback is possible can be illustrated with reference to the example of FIG. 1B. In FIG. 1B, partitions A1 and A2 both contain valid software, therefore a rollback from partition A2 to the software partition A1 is possible. On the other hand partitions B1 and B2 do not both contain valid software, therefore, a rollback from B1 to B2 is not possible.

After determining that a rollback is possible, then, as shown in FIG. 4, the upgrade or rollback in-progress flag can be set at block 72. After that, each of the identified partitions 1-N are rolled back at blocks 74-1-74-N. At the completion of all of the rollbacks, the upgrade-in-progress flag can be cleared at block 76.

As mentioned above, when the system is started up again after an upgrade or a rollback, the system selects the most current valid version of the software. In one embodiment of the invention, the software must have valid contents as tested by a matching CRC and the highest upgrade counter. This decision process is described for one embodiment of the invention in more detail with respect to FIG. 6.

Figure 6:
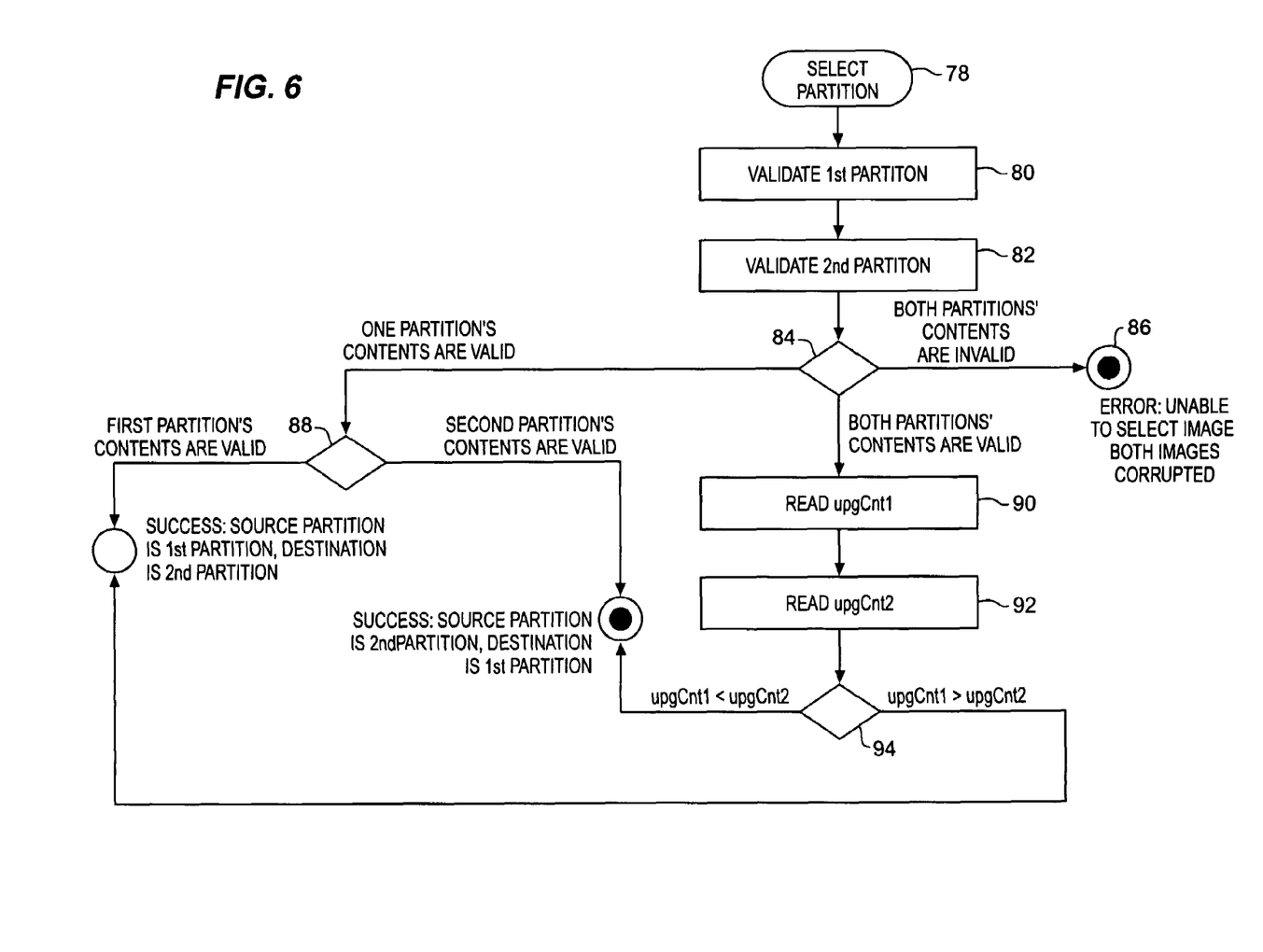
FIG. 6 is a flow chart for identifying source and destination partitions according to one embodiment of the invention.

In FIG. 6, at block 78, a partition for a section of software is selected. The first partition for the selected section is tested for validity at block 80 and the second partition is tested for validity at block 82. If there are more partitions, then they can be tested as well. At block 84 there are three possible results. If it is determined that the contents of both partition are invalid, then, at block 86, an error is set. The system is unable to use any software from this section. If the contents of one of the partitions are valid, then, at block 88, either the contents of the first partition is determined as valid and the system starts up using the first partition software, or the contents of the second partition are valid and the system starts up using the second partition's contents.

On the other hand, if both partitions contain valid software, then, at block 90, the upgrade counter for the first partition is read. At block 92 the upgrade counter for the second partition is read and, at block 94, the upgrade counter values are compared. The system then selects the partition that has the highest upgrade counter value. This allows the system to start up using the most current software version.

Figure 7:
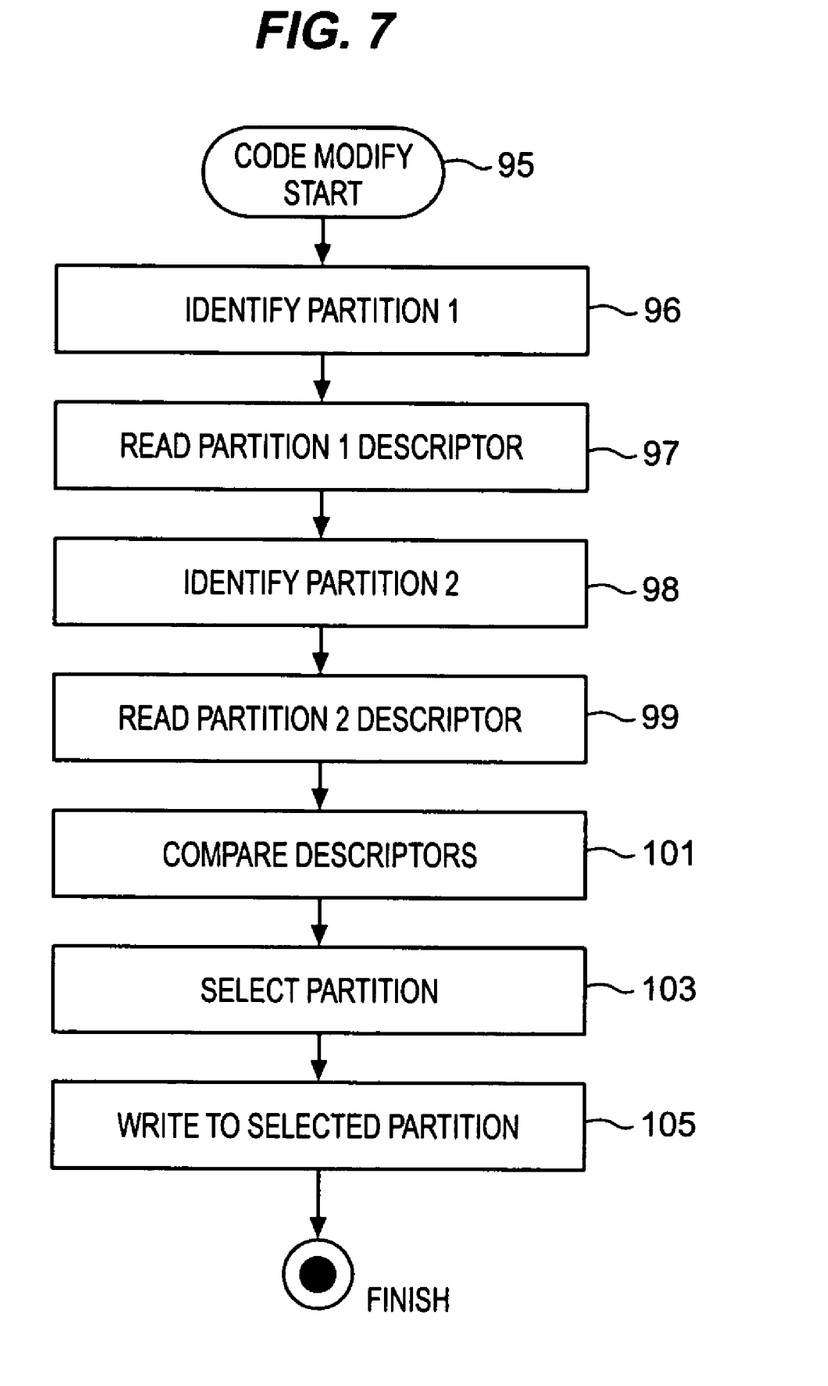
FIG. 7 is a flow chart for modifying software versions in memory partitions according to one embodiment of the invention.

Another embodiment of the present invention is shown in the flow chart of FIG. 7. In the example of FIG. 7, the process may modify code in a memory partition either by updating or rolling back the code. The code can be in a permanent or volatile memory. The process starts at block 95 and then identifies a first memory partition at block 96. This memory partition can be one of two or more memory partitions for a particular software section or it can be a partition for the entire code. The partition can be a permanent memory partition such as partition A1 of FIG. 1A. The first partition, as with all the other partitions may or may not contain software code and the software code, if present, may or may not be valid and operational. Next a descriptor for the identified partition is read at block 97. The descriptor can be any of the types mentioned above, such as an upgrade counter, a time stamp, a flag for the most recent version, or a validity flag. Other types of descriptors can also be used and a combination of descriptors can be obtained. Alternatively, the descriptor can be a data validation code from which a valid or invalid flag can be derived. The descriptor may be stored in the first memory partition or in a separate section of memory such as status registers 16 of FIG. 1A.

At block 98, a second memory partition is identified and at block 99, a descriptor for the second partition is read. Additional memory partitions can be identified and the descriptors read or accessed depending upon the configuration of the system. It is not necessary to perform the operations of block 96 to 99 in any particular order.

Having read descriptions associated with at least two memory partitions, the descriptions are compared at block 101. At block 103, a particular one of the memory partitions is selected. The selection can be based on one or more descriptive values for each partition. For example, if a rollback is to be performed then the partition containing the newest, most recent, or an invalid version of software can be selected. If an upgrade is to be performed then the partition containing the oldest, least current or a valid version of software can be selected. Other selection algorithms and criteria can be used, as appropriate, for a particular application of the present invention.

Having selected a partition, program code is written, at block 105, to the selected partition. The program code may be a set of software, middleware or firmware instructions to cause the processor to execute particular functions. In this case, the code may be a more recent or an older version of software that was already present in one or more other memory partitions. It may also be placeholder code or bits that cannot be executed. This can be used to cause the processor to select a different partition. The code may be a string of all "1"'s or "0"'s or it may be code that instructs the processor to load the code from a different partition. Alternatively, the code may be executable but provided with inaccurate data validation codes, so that the processor will deem the code to be invalid and not execute it.

During any or all of the process shown in FIG. 7, various flags and registers can be employed. For example, while writing code to the selected memory partition, an in-progress flag can be set. Registers containing partition descriptors, such as upgrade counters, time stamps and validity codes can be set or updated. Global status registers can also be maintained. These registers may be in the memory partition that store the code or they may be a special status section of the memory such as status registers 16 of FIG. 1A.

The embodiments of the present invention described above enhance reliability and scalability for embedded systems. When an upgraded software section is not working properly or is no longer wanted, the software section can be rolled back to a previous version safely and easily. By dividing the software into sections, upgrades and rollbacks can be done to only a portion of the entire code. This is very useful in development and is also helpful in establishing control and security in just those systems that need upgrading. Embodiments of the present invention are particularly useful in systems for which reliability is important.

Figure 8:
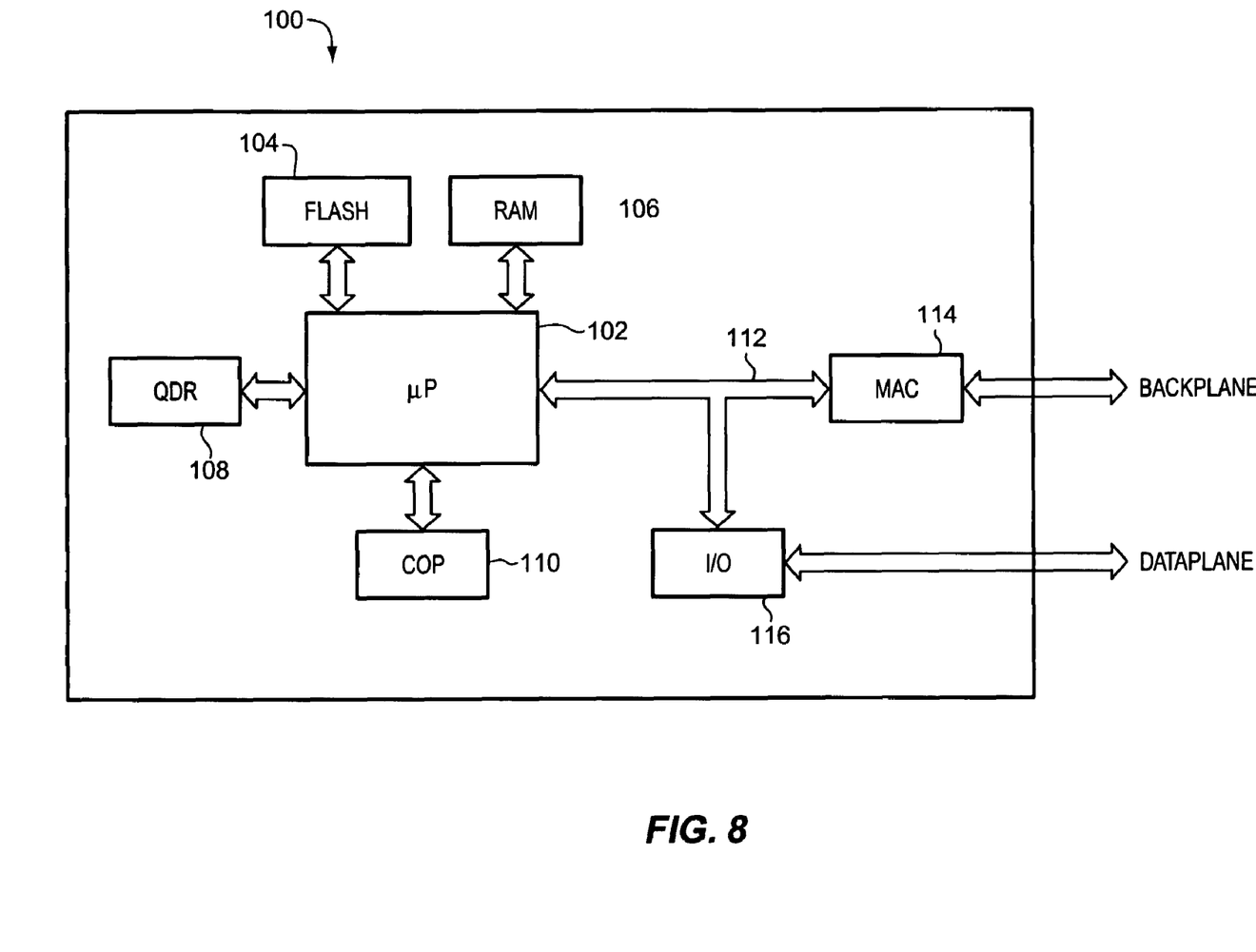
FIG. 8 is a block diagram of a radio network line card suitable for implementing one embodiment of the invention.

Embodiments of the present invention can be applied to a great variety of different devices including embedded systems and other software-driven systems. An example of an embedded system suitable for use with some embodiments of the present invention is shown in FIG. 8. FIG. 8 is a block diagram of a data communications line card appropriate for a telephony or radio network. Such a card design can be applied to ATM data relay systems, to 3G radio communication systems, to high bandwidth entertainment broadcasting systems and to many other applications.

The example radio network line card 100 in FIG. 8 features a microprocessor 102 similar to that shown and described in FIGS. 1A through 1E. The microprocessor is connected to flash memory 104 which it uses for start up. This flash memory can include the memory partitions 12, 14, 16 shown in FIGS. 1A through 1E such as a boot portion, a status portion and several permanent memory partitions. The microprocessor is also coupled to a RAM (Random Access Memory) 106 for use in storing operations and application data. The microprocessor can also be coupled to a QDR (Quadruple Data Rate RAM or other additional memory 108 and to a coprocessor 110.

A bus 112 couples the microprocessor to a MAC (Media Access Control) interface 114. The MAC interface couples the card to a control backplane. Through the bus 112, the microprocessor can also be coupled to an I/O (Input/Output) interface 116. The I/O interface couples the microprocessor to a data plane. More or fewer interfaces can be used depending on the application. Data and control can be communicated over the same bus and channels and different types of data can be communicated through several different interfaces all connected to the microprocessor 102. The radio network line card can be combined with other line cards to form, for example, a radio network controller that controls signals and signaling at base transceiver stations of a radio data network. The line cards can communicate using any of a variety of different interfaces including ATCA (Advanced Telecommunications Computing Architecture) or System 7 and communicate data to and from a variety of base stations or other radio interfaces.

It is to be appreciated that a lesser or more equipped system than the example described in FIG. 8 may be used for other implementations. Therefore, the configuration of the device will vary from implementation to implementation depending upon numerous factors, such as price constraints, performance requirements, technological improvements, or other circumstances.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, operations and functions. These may be performed by hardware components, such as those shown in FIGS. 1 and 8, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio, or network connection).

Importantly, while the present invention has been described in the context of a radio network line card, it can be applied to a wide variety of software driven systems that use a memory to store startup code. Such systems include data network devices for wired and wireless systems, peripheral and stand alone computer components, and industrial and household appliances. Many of the methods are described above in a basic or specific form but steps can be added to or deleted from any of the methods and information can be added or subtracted from any of the status and descriptive registers without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   identifying a first partition of an embedded program memory;
   reading a description associated with the first partition;
   identifying a second partition of an embedded program memory;
   reading a description associated with the second partition;
   comparing descriptions;
   selecting an embedded program memory partition containing newer stored program code using the comparison; and
   writing program code to the selected program memory partition by writing a code invalid marker of the partition description associated with the selected program memory partition.

2. The method of claim 1, wherein reading a description comprises reading a value of an upgrade counter register.

3. The method of claim 2, wherein the upgrade counter register value comprises a time stamp.

4. The method of claim 2, wherein the program code is an upgraded program code and wherein selecting an embedded program memory partition comprises selecting the embedded program memory partition corresponding to the older of the upgrade counter values.

5. The method of claim 2, further comprising incrementing the upgrade counter value corresponding to the selected program memory portion.

6. The method of claim 1, wherein reading a description comprises reading a flag that indicates whether the software in the partition is valid.

7. The method of claim 1, further comprising decrementing an upgrade counter for the selected embedded memory partition.

8. The method of claim 1, further comprising checking the written program code in the selected embedded program memory partition for errors and, if no errors are found, then incrementing an upgrade counter corresponding to the selected upgrade memory counter.

9. The method of claim 1, further comprising setting a flag during writing program code.

10. A machine-readable medium having stored thereon data representing instructions which, when executed by a machine, cause the machine to perform operations comprising:
    identifying a first partition of an embedded program memory;
    reading a description associated with the first partition;
    identifying a second partition of an embedded program memory;
    reading a description associated with the second partition;
    comparing descriptions;
    selecting an embedded program memory partition containing newer stored program code using the comparison; and writing program code to the selected program memory partition by writing a code invalid marker of the partition description associated with the selected program memory partition.

11. The medium of claim 10, wherein the instructions for reading a description comprise instructions which, when executed by the machine, cause the machine to perform further operations comprising reading a value of an upgrade counter register.

12. The medium of claim 11, wherein the program code is an upgraded program code and wherein the instructions for selecting an embedded program memory partition comprise instructions which, when executed by the machine, cause the machine to perform further operations comprising selecting the embedded program memory partition corresponding to the older of the upgrade counter values.

13. The medium of claim 10, wherein the instructions for reading a description comprise instructions which, when executed by the machine, cause the machine to perform further operations comprising reading a flag that indicates whether the software in the partition is valid.

14. An apparatus comprising:
    an embedded program memory having a first partition and a second partition;
    a first register is configured to store a description associated with the first partition;
    a second register is configured to store a description associated with the second partition; and
    a processor is configured to identify the first partition and the second partition, to read the stored descriptions associated with the first partition and the second partition, to compare descriptions, to select a partition containing newer stored program code using the comparison, and to write program code to the selected program memory partition by writing a code invalid marker of the partition description associated with the selected program memory partition.

15. The apparatus of claim 14, wherein the first description register comprises an upgrade counter register.

16. The apparatus of claim 15, wherein the upgrade counter register comprises a time stamp register.

17. The apparatus of claim 14, wherein the second description register comprises a flag register to indicate whether the software in the partition is valid.

18. The apparatus of claim 14, wherein the processor is further to check the written program code in the selected embedded program memory partition for errors and, if no errors are found, then increment an upgrade counter correspond to the selected upgrade memory counter.

19. The apparatus of claim 14, wherein the processor is further to set a flag during writing program code.

20. A system comprising:
   a flash memory having a first partition and a second partition;
   an upgrade counter is configured to store a count associated with the first partition;
   an upgrade counter is configured to store a count associated with the second partition;
   a bus coupled to the flash memory and the counters;
   an I/O interface coupled to the bus to communicate data to external components; and
   a processor coupled to the bus is configured to identify the first partition and the second partition, to read the upgrade counters, to compare the upgrade counts, to select a partition containing newer stored program code using the comparison, and to write program code to the selected program memory partition by writing a code invalid marker of the partition description associated with the selected program memory partition.

21. The system of claim 20, further comprising a validity flag for the first partition and a validity flag for the second partition and wherein the processor reads the validity flags can applies the validity flag values to select a partition.

22. The system of claim 20, wherein the program code is an upgraded program code and wherein the processor selects a partition by selecting the partition corresponding to the older of the upgrade counter values.

* * * * *